United States Patent
Pass

(10) Patent No.: US 7,203,964 B1
(45) Date of Patent: Apr. 10, 2007

(54) METHOD OF STOPPING INTERNET VIRUSES

(75) Inventor: Elmer V. Pass, 822 Monaco Dr., Punta Gorda, FL (US) 33950

(73) Assignee: Elmer V. Pass, Punta Gorda, FL (US)

( * ) Notice: Subject to any disclaimer, the term of this patent is extended or adjusted under 35 U.S.C. 154(b) by 713 days.

(21) Appl. No.: 10/679,276

(22) Filed: Oct. 7, 2003

(51) Int. Cl.
*H04L 29/00* (2006.01)

(52) U.S. Cl. .......................................... 726/24; 726/13

(58) Field of Classification Search ................ None
See application file for complete search history.

(56) References Cited

U.S. PATENT DOCUMENTS

| | | | |
|---|---|---|---|
| 5,774,077 A * | 6/1998 | Schouhamer Immink | 341/50 |
| 5,889,943 A | 3/1999 | Ji et al. | |
| 5,964,889 A | 10/1999 | Nachenberg | |
| 6,205,432 B1 * | 3/2001 | Gabbard et al. | 705/14 |
| 6,338,141 B1 | 1/2002 | Wells | |
| 6,357,008 B1 * | 3/2002 | Nachenberg | 726/24 |
| 6,363,487 B1 | 3/2002 | Schneider | |
| 6,397,335 B1 | 5/2002 | Franczek et al. | |
| 6,591,362 B1 | 7/2003 | Li | |
| 6,910,134 B1 * | 6/2005 | Maher et al. | 726/24 |
| 7,017,187 B1 * | 3/2006 | Marshall et al. | 726/24 |
| 2003/0217286 A1 * | 11/2003 | Carmona et al. | 713/200 |
| 2004/0015554 A1 * | 1/2004 | Wilson | 709/206 |
| 2004/0073617 A1 * | 4/2004 | Milliken et al. | 709/206 |
| 2006/0085724 A1 * | 4/2006 | Merritt | 714/776 |

\* cited by examiner

*Primary Examiner*—Gilberto Barron, Jr.
*Assistant Examiner*—Khoi Nguyen

(57) ABSTRACT

A method for stopping Internet viruses from spreading via Email and Email attachments which damage computer systems. This comprises a first routine that is inserted into the program which receives Email and Email attachments that saves the first 64 bits of data (note: not to include the TCP/IP header) into a created header for this data and inserting binary zero into the first 64 bits, a second routine which ask the user if they would like to replace the first 64 bits of data, and a third routine that insures the first 64 bits of data are restored if the Email or Email attachment is being forwarded.

1 Claim, 1 Drawing Sheet

METHOD OF STOPPING INTERNET VIRUSES

BACKGROUND OF THE INVENTION

A. Field of the Invention

This invention relates to methods and systems for blocking computer viruses in computer Email and Email attachments. This method could be used on any transfer of data between any two devices.

B. Description of the Prior Art

One of the most serious threats to Internet Commerce is the threat of a coordinated attack on the Internet system by a foreign government or terrorist which could launch hundreds of viruses at the same time, causing a complete shutdown of the Internet system. In addition there are computer hackers who are constantly devising viruses which are capable of blocking private and commercial systems, causing millions of dollars in damage to commerce and an enormous cost of repairing the damage for the average user.

A number of systems have been designed to screen and block viruses, however, they only work after the virus has been identified and an identifier has been installed on user computers. When new viruses or worms are introduced, the current systems do not stop them. In addition, since there are so many viruses to check for, the process takes a lot of computer time and must be updated regularly.

One such virus is the "I Love You" letter which was felt worldwide and caused 8.7 billion dollars according to research from Computer Economics. An article in the July 200 Popular Science Magazine (page 48) the "Love Bug" is relatively lightweight, from a technical perspective. More recently, two worms were released that caused major commercial disruption. Over one million computers were affected, it stopped some railroad and complicated registration at colleges.

The proliferation of computers in the workforce today has significantly increased the importance of electronic data storage. The loss of which can lead to unacceptable disruptions of operations.

In response, data recovery methods have been implemented such as the method disclosed in U.S. Pat. No. 6,363,487. A system is disclosed for a protected data storage medium. The protected data storage medium includes a storage medium that includes a protected area. In addition, the protected data storage includes a controller that is capable of controlling access to the storage medium. Other related systems are disclosed in U.S. Pat. Nos. 5,889,943; 5,964,889; 6,338,141; and 6,591,362.

SUMMARY OF THE INVENTION

The present invention provides a method for stopping Internet viruses from spreading via Email and Email attachments which can damaging computer systems by preventing Email distributed viruses from activating in a protected computer. The method comprises of saving the first 64 bits of data in an Email or Email attachment in a created header and replacing it with a binary zero which is a halt command to a program.

BEST MODE OF CARRYING OUT THE INVENTION

Figure 3:
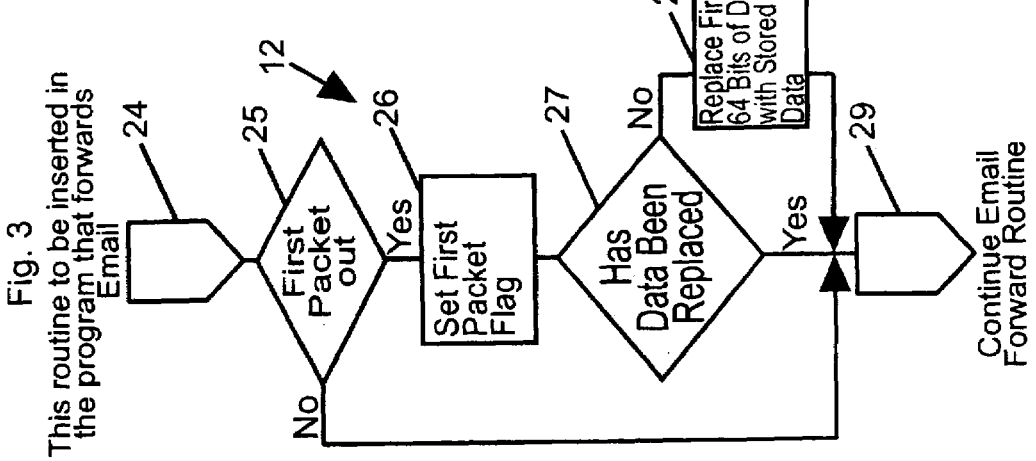
FIG. 3 is a flow chart of the routine to be inserted into the program that forwards Email and the program that forwards Email attachments.
Figure 2:
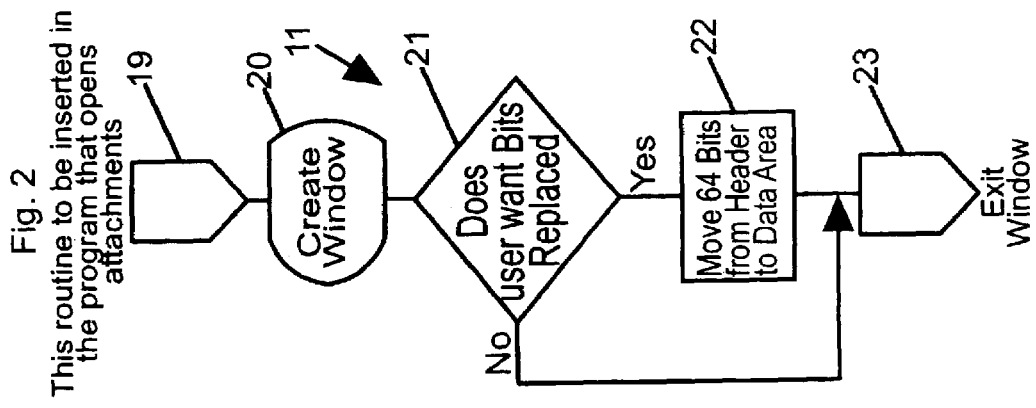
FIG. 2 is a flow chart of the routine to be inserted into the program that opens Email and Email attachments.
Figure 1:
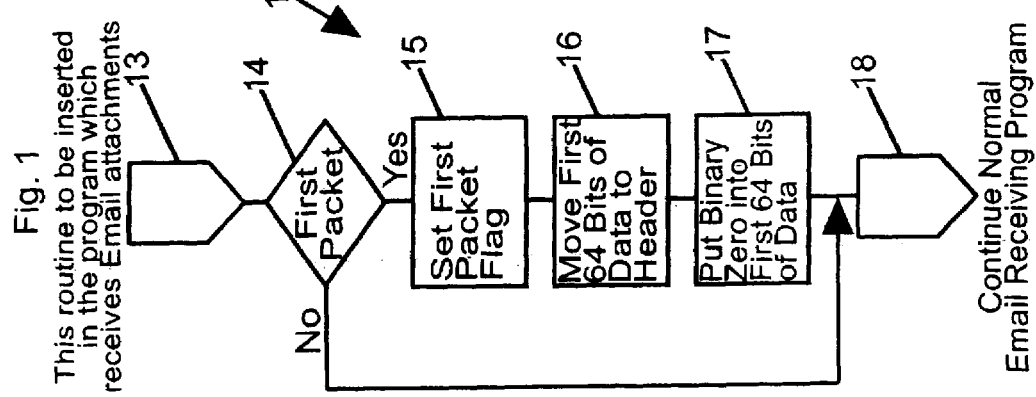
FIG. 1 is a flow chart of the routine to be inserted into the program which receives Email and the routine that receives Email attachments.

As shown in the accompanying figures, the routine to be inserted in the program which receives Email and the program that receives Email attachments is designated by the numeral 10, the routine to be inserted in the program that opens Email and Email attachments is designated by the numeral 11, and the routine to be inserted in the program that forwards Email and Email attachments is designated by the numeral 12.

The first step 13 of the method of stopping Internet viruses via Email and Email attachments is to insert routine 10 into the user's computer program which receives Email and Email attachments from the server. Then check the first packet flag 14 to see if this is the first packet for this Email or Email attachment. (Note: the flag would be initialized to say first packet has not come in.)(Note: Email and Email attachments are sent in packets or small groups of data and then assembled at the destination. Since this method is only concerned with the first 64 bits of data, (Note: not to include the TCP/IP header.) Only the first packet of data need be addressed.) If this is the first packet 14, set the first packet flag 15 to say first packet has come in. Move the first 64 bits of data to a reserved place in a created header 16 for this Email or Email attachment. Put a binary zero into the first 64 bits of data 17 for this packet. (Note: Binary zero is a halt command to a program.) Continue the normal receiving program 18. If the flag was set to say the first packet had come in, continue the normal receiving program 18.

The second step 19 of stopping Internet viruses via Email and Email attachments is to insert the routine 11 in the program that opens Email and Email attachments. The next step is to create a window 20 that ask the user if they would like to replace the first 64 bits of data 21 in the Email or Email attachment. (Note: One can readily see a text or a picture Email or attachment and have no problem identifying those as valid data. The window should display the length of the data to assist the user in determining the validity of the data. If one can not identify the data, they should not replace the 64 bits of data until they verify the contents. If viruses are known to exist, the media could publicize the length to alert computer users.) If the user typed a "Y" indicating they want the bits replaced, move the 64 bits from the header 22 into the first 64 bits of data. Exit the routine at 23. If the user does not want to replace the bits, continue to the exit 23.

The third step 24 of stopping Internet viruses via Email or Email attachments is to insert the routine 12 into the user's computer program that forwards Email and Email attachments. Check the first packet out flag 25 to see if this is the first packet out. (Note: the first packet out flag is initialized to say first packet out.) If this is the first packet out, set the first packet out flag to say not first packet. Check to see if the first 64 bits have been replaced 27. If the data has not been replaced, replace the first 64 bits of data with stored data 28. Continue with the forwarding routine 29. If the data has been replaced, continue with the forwarding program 29. If this is not the first packet out, continue with the forwarding program 29.

This method of stopping Internet viruses via Email or Email attachments presents options the user must make and presents information to aid in that decision.

Although the invention has been described by way of example and with reference to possible embodiments, it is to be appreciated that improvements and/or modifications may be made to these embodiments without departing from the scope of the invention.

What is claimed is:

1. A method for stopping internet viruses from spreading and damaging computer memory systems, said method comprising the steps of:

inserting a first routine in a program which receives Email attachments, said first routine including the step of moving only a first 64 bits of data of a first packet of an Email attachment to a reserved place in a header of the Email attachment and placing a binary zero into the first 64 bits of data of the first packet of the Email attachment, and inserting a second routine in the program that opens attachments, said second routine including the step of asking the user if they would like to replace the first 64 bits of data in the Email attachment. If the user concurs, the second routine will switch the first 64 bits of data in the Email attachment with original data in the reserved place as selected, and inserting a third routine including the step of checking to see if the first 64 bits of data in the Email attachment has been replaced before forwarding and if the data has not been replaced, and replacing the first 64 bits of data in the Email attachment with stored data in the reserved place and continuing the Email forwarding routine.

* * * * *